US007197348B2

United States Patent
Pan

(12) United States Patent
(10) Patent No.: US 7,197,348 B2
(45) Date of Patent: Mar. 27, 2007

(54) MOBILE PHONE WITH INTERCHANGEABLE HOUSING

(75) Inventor: Long-Jyh Pan, Taipei (TW)

(73) Assignee: BENQ Corporation, Taoyuan (TW)

( * ) Notice: Subject to any disclaimer, the term of this patent is extended or adjusted under 35 U.S.C. 154(b) by 381 days.

(21) Appl. No.: 10/760,603

(22) Filed: Jan. 20, 2004

(65) Prior Publication Data
US 2004/0152496 A1    Aug. 5, 2004

(30) Foreign Application Priority Data
Jan. 21, 2003    (TW) .............................. 92201064 U

(51) Int. Cl.
*H04M 1/00* (2006.01)
(52) U.S. Cl. ................ 455/575.8; 455/575.1; 455/347; 455/348; 455/575.4; 361/679; 361/681; 361/724; 361/734
(58) Field of Classification Search ............. 455/575.1, 455/575.8, 347, 348, 90.1, 90.2, 90.3, 575.4; 361/679, 681, 724, 734
See application file for complete search history.

(56) References Cited
U.S. PATENT DOCUMENTS

| | | | | |
|---|---|---|---|---|
| 4,912,602 A | * | 3/1990 | Zurek et al. ................. | 361/752 |
| 5,665,485 A | * | 9/1997 | Kuwayama et al. ........ | 429/100 |
| 6,111,760 A | * | 8/2000 | Nixon ........................ | 361/814 |
| 6,975,889 B2 | * | 12/2005 | Chen et al. .............. | 455/575.1 |
| 2003/0068035 A1 | * | 4/2003 | Pirila et al. ................. | 379/447 |
| 2003/0100276 A1 | * | 5/2003 | Lee et al. ..................... | 455/90 |
| 2004/0203514 A1 | * | 10/2004 | Cheng et al. .............. | 455/90.3 |

* cited by examiner

*Primary Examiner*—Lester G. Kincaid
*Assistant Examiner*—Shantell Portis
(74) *Attorney, Agent, or Firm*—Quintero Law Office

(57) ABSTRACT

A mobile phone with an interchangeable housing. The mobile phone includes a body, a front housing, a rear cover, a battery cover, and a battery pack. The body includes an engaging member. The front housing is detachably disposed on the body via the engaging member. The rear cover is detachably disposed on the body via the engaging member. The battery cover is detachably disposed on the body. The body is covered by the front housing, the rear cover, and the battery cover. The battery pack is disposed on the body, and includes a projecting portion. The projecting portion is abutted by the engaging member so as to move the engaging member.

16 Claims, 5 Drawing Sheets

MOBILE PHONE WITH INTERCHANGEABLE HOUSING

BACKGROUND OF THE INVENTION

1. Field of the Invention

The invention relates to a mobile phone; in particular, to a mobile phone with an interchangeable housing.

2. Description of the Related Art

Recently, mobile phones have become an indispensable tool for communication. However, the shapes of compact mobile phones have rarely satisfied users. For example, it is important for a user to be able to change the cover of the mobile phone to satisfy his personal taste.

In view of this, the mobile phones with special shapes or colors have been provided by mobile phone manufacturers. Furthermore, the housing of some mobile phones can be changed based on the choice of the user. In addition, the color of the housing of some mobile phones can be changed in a different view or by different light so as to show the personal character of the user. Since personalized products are more popular recently, the market for mobile phones with interchangeable housings will probably increase.

There are many ways to change the housing of the mobile phone. For example, the housings of some mobile phones are partially changeable. That is, only the front or rear housing are changeable. In some mobile phones, both the front and rear housing are changeable. When the housing is disassembled in most mobile phones, however, both the front and rear housing are changeable by physical manipulation. Thus, the circuit or component assembly inside the mobile phone may be damaged during the disassembly of the housing, and the structure of the housing may also be deformed due to improper application of force after repeated replacements. As a result, the structure of the entire mobile phone may be unstable after re-assembly. In addition, some manufacturers encourage the user to bring the mobile phone to the original retail sales outlet so that the housing of the mobile phone can be changed by a professional, which may be inconvenient. Furthermore, even if the housing is changed by a professional, the mobile phone may be damaged by the replacement process.

In addition, in some mobile phones with interchangeable housing, an additional removing device is disposed on its housing so as to assist in disassembly. However, since the removing device is exposed, the appearance of the mobile phone may be aesthetically unattractive.

SUMMARY OF THE INVENTION

In view of this, the invention provides a mobile phone with a conveniently interchangeable housing.

In this invention, a mobile phone with an interchangeable housing is provided. The mobile phone includes a body, a front housing, a rear cover, a battery cover, and a battery pack. The body includes an engaging member. The front housing is detachably disposed on the body via the engaging member. The rear cover is detachably disposed on the body via the engaging member. The battery cover is detachably disposed on the body. The body is housed by the front housing, the rear cover, and the battery cover. The battery pack is disposed on the body, and includes a projecting portion. The projecting portion is abutted by the engaging member so as to move the engaging member.

In a preferred embodiment, the body includes a guide rail for the engaging member to move thereon.

Furthermore, the engaging member is formed with a concave portion, and the guide rail includes a protrusion corresponding to the concave portion. Thus, the engaging member can be positioned at a predetermined position on the guide rail by engaging the protrusion with the concave portion.

In another preferred embodiment, the engaging member is formed with a groove, and the front housing includes a first hook corresponding to the groove. The front housing is positioned on the body by engaging the first hook with the groove.

In another preferred embodiment, the rear cover includes a second hook corresponding to the groove. The rear cover is positioned on the body by engaging the second hook with the groove.

In another preferred embodiment, the projecting portion includes a first inclined surface abutted by the engaging member, and the engaging member includes a second inclined surface abutted by the projecting portion. Thus, the engaging member can be smoothly moved by the battery pack.

In another preferred embodiment, the battery cover includes a pressed member, and the body includes an elastic member corresponding to the pressed member. The battery cover is positioned on the body by engaging the pressing member with the elastic member.

In another preferred embodiment, the body is formed with a hole, and the front housing includes a fixed member. The front housing is positioned on the body by engaging the fixed member with the hole.

In another preferred embodiment, the shape of the front housing corresponds to the rear cover and the battery cover.

Another preferred embodiment provides two engaging members, and a spring is disposed between the engaging members.

In this invention, an assembly for assembling a mobile phone is provided. The mobile phone includes a body, a front housing, a rear cover, and the assembly includes an engaging member, a first hook, and a second hook. The engaging member is disposed on the body in a manner such that the engaging member moves between a first position and a second position. The first hook, corresponds to the engaging member, and is disposed on the front housing. The second hook corresponds to the engaging member, and is disposed on the rear cover. When the engaging member is located at the first position, the engaging member is engaged with the first hook and the second hook so that the front housing and the rear cover are combined with the body. When the engaging member is located at the second position, the engaging member is disengaged from the first hook and the second hook so that the front housing and the rear cover are separated from the body.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
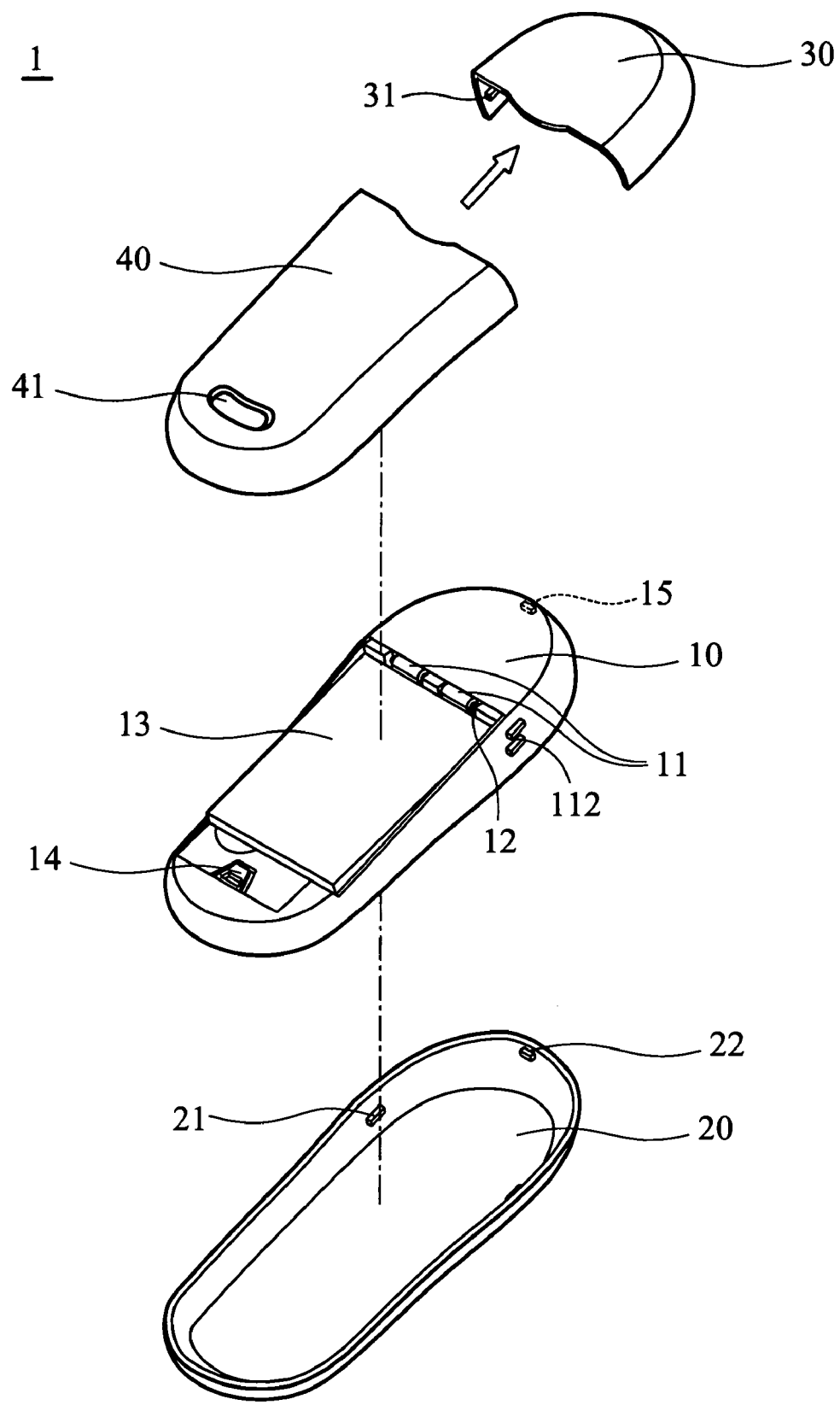
FIG. 1 is an exploded view of a mobile phone with an interchangeable housing as disclosed in this invention.

FIG. 1 shows a mobile phone 1, with an interchangeable housing, as disclosed in this invention. The mobile phone 1 includes a body 10, a front housing 20, a rear cover 30, and a battery cover 40. The body 10 includes two engaging members 11, a guide rail 12, a battery pack 13, an elastic member 14, a hole 15, an antenna (not labeled), a printed circuit board (not shown), and other components.

Each of the engaging members 11 is movably disposed on the guide rail 12. Referring to FIG. 1, each of the engaging members 11 is formed with a groove 112 at a side exposed by the body 10. Furthermore, referring to FIG. 2a and FIG. 2b, each of the engaging members 11 is formed with a concave portion 111 at a surface abutted by the guide rail 12. Furthermore, referring to FIG. 3a and FIG. 3b, each of the engaging members 11 includes an inclined surface 113 abutted by the battery pack 13.

In this embodiment, each of the engaging members 11 is independently movable. However, it is not limited to this manner. For example, an additional spring (not shown) can be disposed between the engaging members 11, and used as a transmission mechanism. Thus, when one engaging member is moved, the other engaging member is simultaneously moved.

Figure 2A:
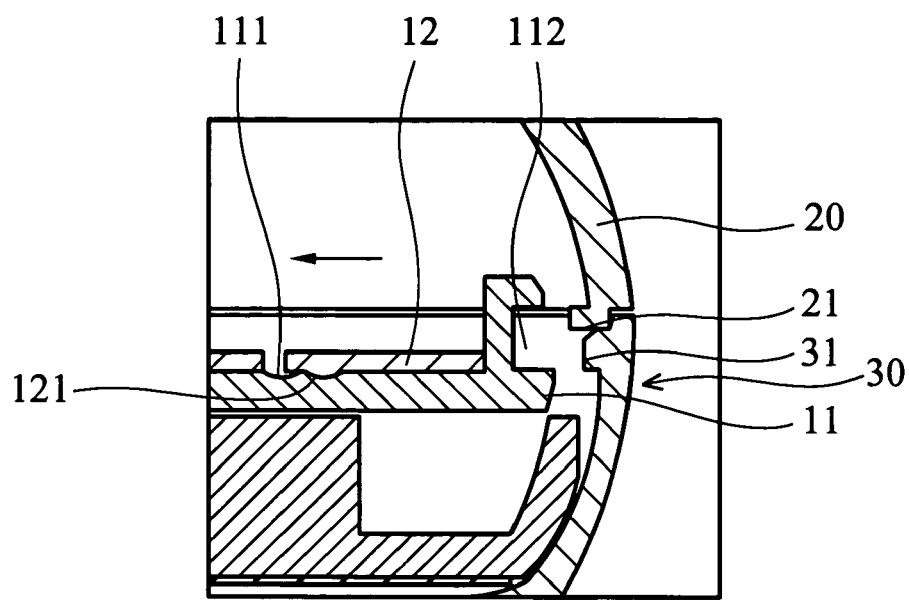
FIGS. 2a–2b is cross sections showing the combined relationship between an engaging member, a first hook, and a second hook in FIG. 1.
Figure 2B:
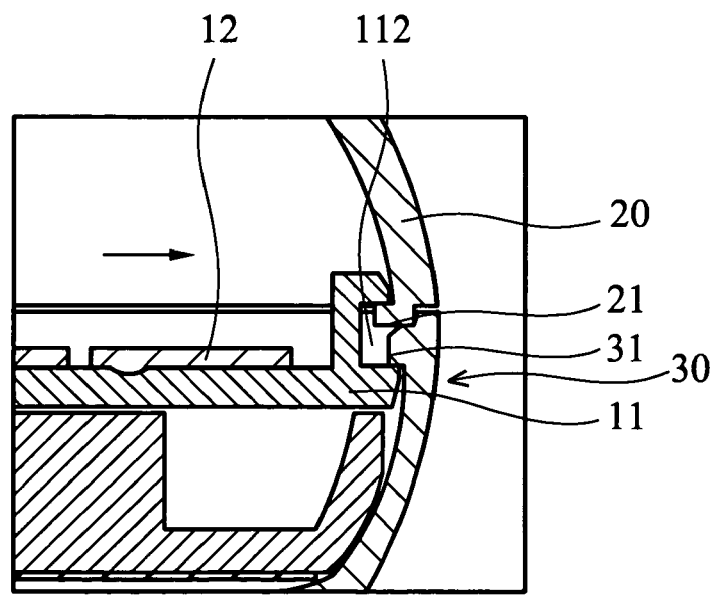

The guide rail 12 is used for the engaging members 11 to move thereon. Referring to FIG. 2a and FIG. 2b, the guide rail 12 is formed with two protrusions 121, corresponding to the concave portions 111 of the engaging members 11, at a surface abutted by the engaging members 11. Thus, the engaging members 11 can be positioned at a predetermined position on the guide rail 12 by engaging the protrusions 121 with the concave portions 111.

Figure 3A:
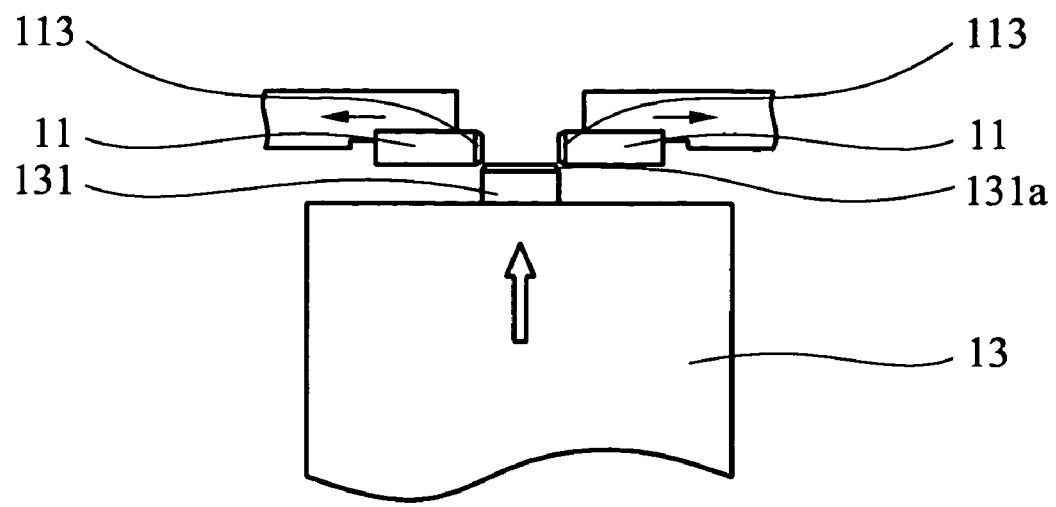
FIGS. 3a–3b are schematic views showing an abutting relationship between the engaging member and a battery pack in FIG. 1.
Figure 3B:
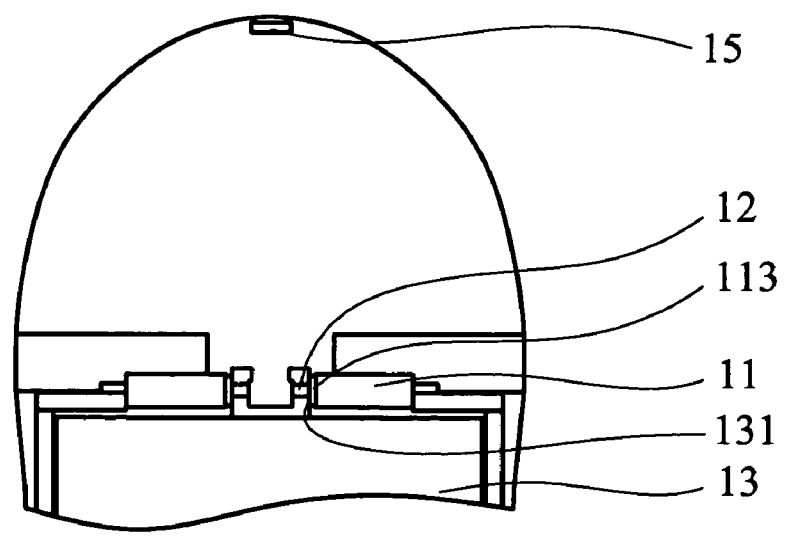

Referring to FIG. 3a and FIG. 3b, the battery pack 13 is disposed on the body 11, and includes a projecting portion 131. The projecting portion 131 is abutted by the engaging members 11 so as to move the engaging members 11 and keep the engaging members 11 in position as shown in FIG. 3b. Furthermore, the projecting portion 131 includes an inclined surface 131a abutted by the engaging members 11. That is, the projecting portion 131 may be used as an abutting member. Thus, the engaging members 11 can be smoothly moved by the battery pack 13 so as to position the engaging members 11 on the guide rail 12.

Figure 4A:
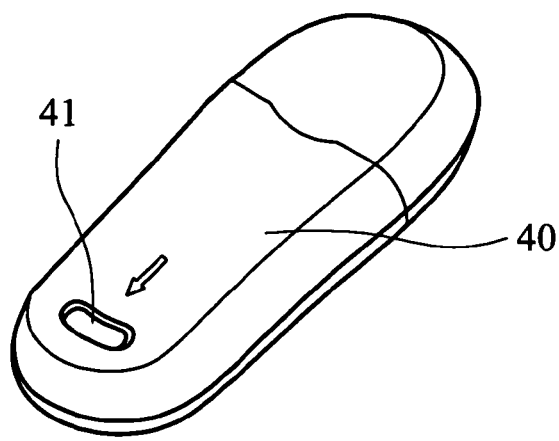
FIGS. 4a–4f are schematic views of the process for changing the housing of the mobile phone in FIG. 1.
Figure 4B:
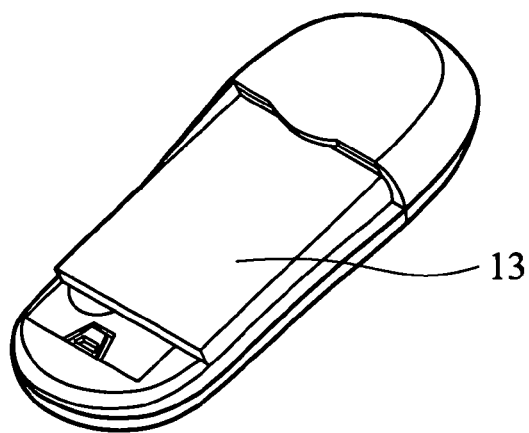
Figure 4C:
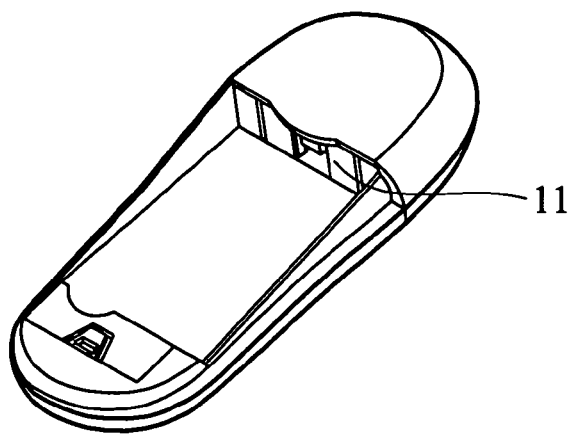
Figure 4D:
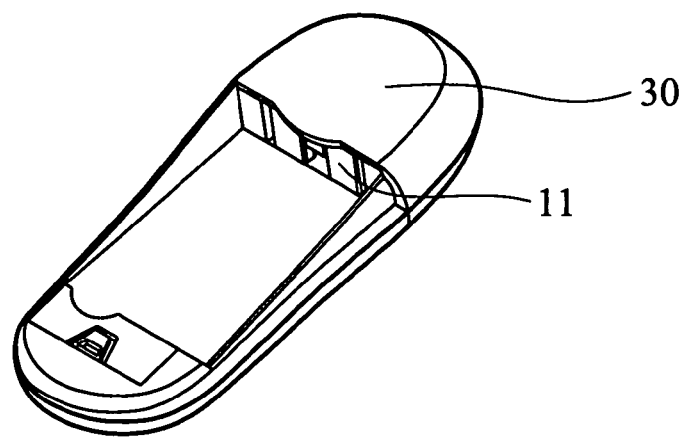

The front housing 20 is detachably disposed on the body 10, and includes two first hooks 21 and a fixed member 22 as shown in FIG. 1. In this embodiment, the front housing 20 is used as a front panel assembly of the mobile phone 20, and is provided with keys, a display, and other elements thereon. Furthermore, referring to FIG. 2b, each of the first hooks 21 is integrally formed with the front housing 20, and corresponds to the groove 112 of the engaging member 11 respectively. When the engaging members 11 are able to move freely to a first position as shown in FIG. 4c from a second position as shown in FIG. 4d by the battery pack 13, the protrusions 121 are engaged with the concave portions 111 as shown in FIG. 2b. Thus, the engaging members 11 are engaged with the first hooks 21 so that the front housing 20 is combined with the body 10. In addition, the position of the fixed member 22 corresponds to the hole 15 of the body 10. The front housing 20 can be positioned on the body 10 more stably by engaging the fixed member 22 with the hole 15.

The rear cover 30 is detachably disposed on the body 10, and covers the antenna of the body 10 and includes two second hooks 31 thereon. Referring to FIG. 2b, each of the second hooks 31 is integrally formed on the rear cover 30, and corresponds to the groove 112 of the engaging member 11 respectively. The rear cover 30 is stably positioned on the body 10 by engaging the second hook 31 with the groove 112.

The battery cover 40 is detachably disposed on the body 10, and the shape of the front housing 20 corresponds to those of the rear cover 30 and the battery cover 40. Thus, the body 30 may be completely housed by the front housing 20, the rear cover 30, and the battery cover 40. Furthermore, the battery cover 40 is formed with a pressed member 41 corresponding to the elastic member 14 of the body 10. Thus, the battery cover 40 can be positioned on the body 10 by engaging the pressing member 41 with the elastic member 14.

The structure of the mobile phone 1 of this invention is described as above. Referring to FIGS. 4a–4f, the process for changing the housing of the mobile phone 1 is described as follows.

Figure 4E:
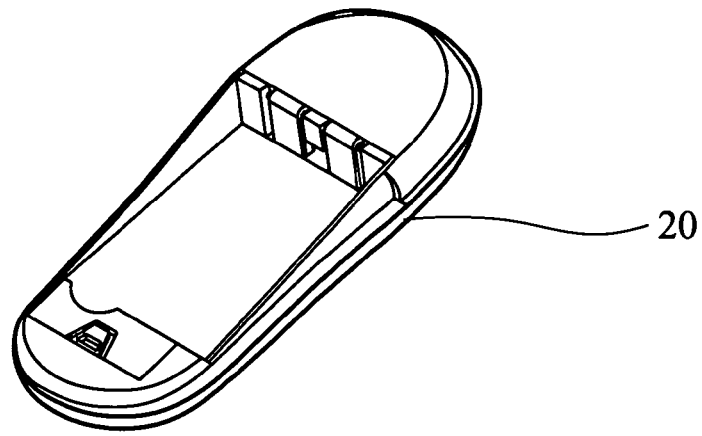
Figure 4F:
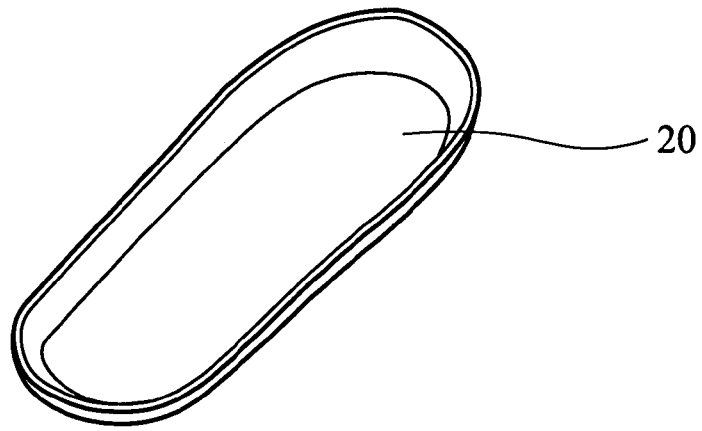

First, the pressed member 41 on the battery cover 40 is pressed down so that the pressed member 41 is separated from the elastic member 14 on the body 10. At the same time, the battery cover 40 is moved downward along a direction as shown in an arrow of FIG. 4a so that the battery cover 40 is separated from the body 10 as shown in FIG. 4b. Then, the battery pack 13 is removed from the body 10 as shown in FIG. 4c. It is noted that the engaging members 11 are located at the first position at this time. Since the engaging members 11 are not abutted by the projecting portion 131 of the battery pack 13, the engaging members 11 can be moved freely to the second position from the first position so that the grooves 111 of the engaging members 11 are disengaged from the first hook 21 of the front housing 20 and the second hook 31 of the rear cover 30 as shown FIG. 4d. The rear cover 30 is sequentially removed as shown in FIG. 4e. Finally, the front housing 20 is separated from the body 10 as shown in FIG. 4f so that the entire housing is removed.

In contrast, the housing can be assembled on the body in a manner opposite to the disassembly. Specifically, the front housing 20 and the rear cover 30 are first disposed on the body 10. Then, the engaging members 11 are moved to the first position so that the grooves 112 are engaged with the first hook 21 of the front housing 20 and the second hook 31 of the rear cover 30. At this time, the protrusions 121 on the guide rail 12 are engaged with the concave portions 111 of the engaging members 11 so that the engaging members 11 are temporarily positioned at a predetermined position. The battery pack 13 is sequentially disposed on body 10 so that the engaging members 11 are abutted by the projecting portions 131. Finally, the battery cover 40 is combined with the body 10 so as to complete the assembly of the housing.

It is understood that before the engaging members 11 are engaged with the first hook 21 of the front housing 20, the front housing 22 can be temporarily positioned on the body 10 by the fixed member 22 of the front housing 20 inserting into the hole 15 on the body 10.

In a mobile phone with a built-in antenna, the rear cover 30 can cover the antenna portion on the body 10. In a mobile phone with a projecting antenna, the rear cover 30 can be used to encase the electronic component of the body 10. That is, the design of this invention can be applied to both a mobile phone with a built-in antenna and a mobile phone with a projecting antenna.

By the design of this invention, the color or the keys of the housing can be changed, and the shape of the entire housing can also be changed. Furthermore, since the housing can be changed by the engaging member, it needs not be forcibly separated from the body by a tool. Thus preventing damage to the housing during replacement. As a result, the appearance of the mobile phone can be maintained.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile phone comprising:
   a body including an engaging member and a guide rail;
   a front housing detachably disposed on the body via the engaging member;
   a rear cover detachably disposed on the body via the engaging member;
   a battery cover detachably disposed on the body, wherein the body is housed by the front housing, the rear cover, and the battery cover; and
   a battery pack, disposed on the body, including a projecting portion, wherein the projecting portion pushes the engaging member to move along the guide rail.

2. The mobile phone as claimed in claim 1, wherein the engaging member is formed with a concave portion, and the guide rail includes a protrusion corresponding to the concave portion, whereby the engaging member can be positioned at a predetermined position on the guide rail by engaging the protrusion with the concave portion.

3. The mobile phone as claimed in claim 1, wherein the engaging member is formed with a groove, and the front housing includes a first hook corresponding to the groove, wherein the front housing is positioned on the body by the first hook engaging with the groove.

4. The mobile phone as claimed in claim 1, wherein the engaging member is formed with a groove, and the rear cover includes a second hook corresponding to the groove, wherein the rear cover is positioned on the body by the second hook engaging with the groove.

5. The mobile phone as claimed in claim 1, wherein the projecting portion includes a first inclined surface abutted by the engaging member, and the engaging member includes a second inclined surface abutted by the projecting portion, whereby the engaging member can be smoothly moved by the battery pack.

6. The mobile phone as claimed in claim 1, wherein the battery cover includes a pressed member, and the body includes an elastic member corresponding to the pressed member, and the battery cover is positioned on the body by engaging the pressing member with the elastic member.

7. The mobile phone as claimed in claim 1, wherein the body is formed with a hole, and the front housing includes a fixed member, and the front housing is positioned on the body by engaging the fixed member with the hole.

8. The mobile phone as claimed in claim 1, wherein the shape of the front housing corresponds to those of the rear cover and the battery cover.

9. The mobile phone as claimed in claim 1, wherein the number of the engaging members is two, and a spring is disposed between the engaging members.

10. An assembly for assembling a mobile phone, wherein the mobile phone includes a body, a front housing, a rear cover, and the assembly comprises:
    an engaging member disposed on the body in a manner such that the engaging member moves between a first position and a second position;
    a first hook, corresponding to the engaging member, disposed on the front housing;
    a second hook, corresponding to the engaging member, disposed on the rear cover;
    a guide rail; and
    an abutting member to push the engaging member to move along the guide rail for positioning the engaging member;
    wherein the engaging member is engaged with the first hook and the second hook so that the front housing and the rear cover are combined with the body when the engaging member is located at the first position, and the engaging member is disengaged from the first hook and the second hook so that the front housing and the rear cover are separated from the body when the engaging member is located at the second position.

11. The assembly as claimed in claim 10, wherein the engaging member is formed with a concave portion, and the assembly includes a protrusion disposed on the body in a manner such that the protrusion corresponds to the concave portion, whereby the engaging member can be positioned at a predetermined position on the body by engaging the protrusion with the concave portion.

12. The assembly as claimed in claim 10, wherein the engaging member is formed with a groove corresponding to the first hook and the second hook, and the front housing and the rear cover are positioned on the body by engaging the first hook and the second hook with the groove.

13. The assembly as claimed in claim 10, wherein the abutting member includes a first inclined surface abutted by the engaging member, and the engaging member includes a second inclined surface abutted by the abutting member, whereby the engaging member can be smoothly moved by the abutting member.

14. The assembly as claimed in claim 10, wherein the first hook is integrally formed on the front housing.

15. The assembly as claimed in claim 10, wherein the second hook is integrally formed on the rear cover.

16. The assembly as claimed in claim 10, wherein the number of the engaging member is two, and a spring is disposed between the engaging members.

* * * * *